Patented Oct. 1, 1946

2,408,389

UNITED STATES PATENT OFFICE 2,408,389

N,N-DIETHYLBENZAMIDE AS AN INSECT REPELLENT

Samuel I. Gertler, Washington, D. C., assignor to United States of America, as represented by Secretary of Agriculture No Drawing. Application September 4, 1944, Serial No. 552,665

4 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a repellent of such insects as mosquitoes, flies, gnats, fleas, and the like, and has for its objects the preparation of a repellent which is effective long after application, is not easily removed in adverse weather, is not harmful to humans or animals, is not deleterious to textiles, and is not obnoxious in use.

I have found that certain compositions comprising N,N-diethylbenzamide are particularly effective as repellents, as for example, against the Aedes aegypti, which is a species of mosquito very widely distributed, and a common carrier of yellow fever.

Most of the repellents used in the prior art are volatile and soon evaporate. The pure compound, N,N-diethylbenzamide, however, is a relatively non-volatile liquid having a boiling point of 280° C. at ordinary pressures. It has little odor, and when rubbed on the skin, produces no noticeable irritating effect. It is colorless and does not stain fabrics. Consequently, all these properties make it ideal for the purpose intended.

Compositions comprising this substance were used in a number of tests and it was found that protection was obtained for a minimum of 5.5 hours and up to 7.5 hours, and that, under certain conditions, even longer periods of repellent action were obtained.

Various types of compositions can be used to obtain good repellent effects, such compositions in the main, comprising N,N-diethylbenzamide as its essential active ingredient, and a carrier, said carrier being a material or materials into which the N,N-diethylbenzamide is incorporated to produce a composition in a form which may then be readily applied to the region from which the insects are to be repelled. Applicable carriers include dusting powders such as talc, and suitable non-toxic solvents such as ethyl alcohol, glycerol, a mixture of water and an emulsifier like triethanolamine, a mineral oil such as petrolatum, a vegetable oil such as corn oil, cottonseed oil, and peanut oil, and an animal fat such as lanolin. Mixtures of these carriers may also be employed. For example, a mixture of lanolin, petrolatum, and paraffin may be used where it is desired that the composition be in the form of a cream. The carrier used depends on the conditions or purpose for which the repellent action is desired, and therefore, the repellent composition may be in the form of a cream, lotion, dust, and so forth, the proportions of the ingredients being capable of being varied over a wide range. Other materials may be added to these carriers to give them consistency or form, if so desired.

The following are examples of the form and method of use of my invention:

Example I

A repellent composition, in the form of a cream, comprising N,N-diethylbenzamide and a mixture of lanolin, petrolatum, and paraffin. Such a cream may be applied directly to the skin.

Example II

A repellent composition, in the form of a lotion, comprising N,N-diethylbenzamide together with a mineral or vegetable oil, such as corn oil, cotton seed oil, peanut oil, and the like. Such a lotion may also be rubbed directly on the skin.

Example III

Another repellent composition in the form of a lotion, comprising a solution of N,N-diethylbenzamide in ethyl alcohol, glycerol, or any suitable solvent which is harmless to the skin.

Example IV

Another repellent composition in the form of a lotion, comprising an emulsion of N,N-diethylbenzamide emulsified in water by the employment of an emulsifying agent, such as triethanolamine, and such other ingredients as may be necessary to obtain a suitable product.

Example V

A repellent composition, in the form of a dusting powder, comprising adsorbed N,N-diethylbenzamide and a dusting powder, such as talc.

It should be understood that the above type compositions need not be applied only to the skin. The N,N-diethylbenzamide may also be dissolved in alcohol or any volatile solvent and used to impregnate clothing.

Having thus described my invention, I claim:

1. An insect repellent composition comprising N,N-diethylbenzamide incorporated in a carrier selected from the group consisting of a dusting powder and a suitable non-toxic solvent.

2. An insect repellent composition comprising N,N-diethylbenzamide incorporated in a dusting powder.

3. An insect repellent composition comprising N,N-diethylbenzamide incorporated in a suitable non-toxic solvent.

4. A process of repelling insects comprising applying to the region from which the insects are to be repelled a composition containing N,N-diethylbenzamide as its essential active ingredient.

SAMUEL I. GERTLER.